United States Patent [19]

Leveque et al.

[11] Patent Number: 5,952,633
[45] Date of Patent: *Sep. 14, 1999

[54] STEERING COLUMN STALK SWITCH FOR USE WITH MULTIPLEXED ELECTRONIC SWITCHING

[75] Inventors: Denis J. Leveque; Michael R. Larsen, both of Milwaukee, Wis.

[73] Assignee: Eaton Corporation, Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/771,187

[22] Filed: Dec. 20, 1996

[51] Int. Cl.⁶ ............................... H01H 9/00; H01H 3/16
[52] U.S. Cl. ..................... 200/61.54; 200/61.27
[58] Field of Search ............. 200/4, 17 R, 61.27–61.39, 200/61.54, 332, 335; 307/10.1

[56] References Cited

U.S. PATENT DOCUMENTS 3,864,578  2/1975  Lackey ................................ 307/10 R
5,396,106  3/1995  Chretien et al. ...................... 307/10.1
5,610,378  3/1997  DuRocher et al. ................... 200/61.54
5,742,014  4/1998  Schwartz ............................. 200/61.27

*Primary Examiner*—Ronald Stright
*Assistant Examiner*—Michael J. Hayes
*Attorney, Agent, or Firm*—Roger A. Johnston

[57] ABSTRACT

A two piece molded housing shell is connected by inserting connector terminals on one of the shells into receptacles on the other shell with the connected shells configured for mounting over a vehicle steering column. One of the shells has a stalk/lever pivotally mounted thereon with multiplex adaptive circuitry mounted on the other shell. A two-shot molded plastic insert has conductive strips plated on the surface thereof and is inserted into the housing shells to provide an interconnect from the circuitry to the stalk/lever The stalk/lever has switching contacts on a carrier portion thereof. The switching contacts wipe directly on the plated strips of the insert to effect a switching function.

11 Claims, 3 Drawing Sheets

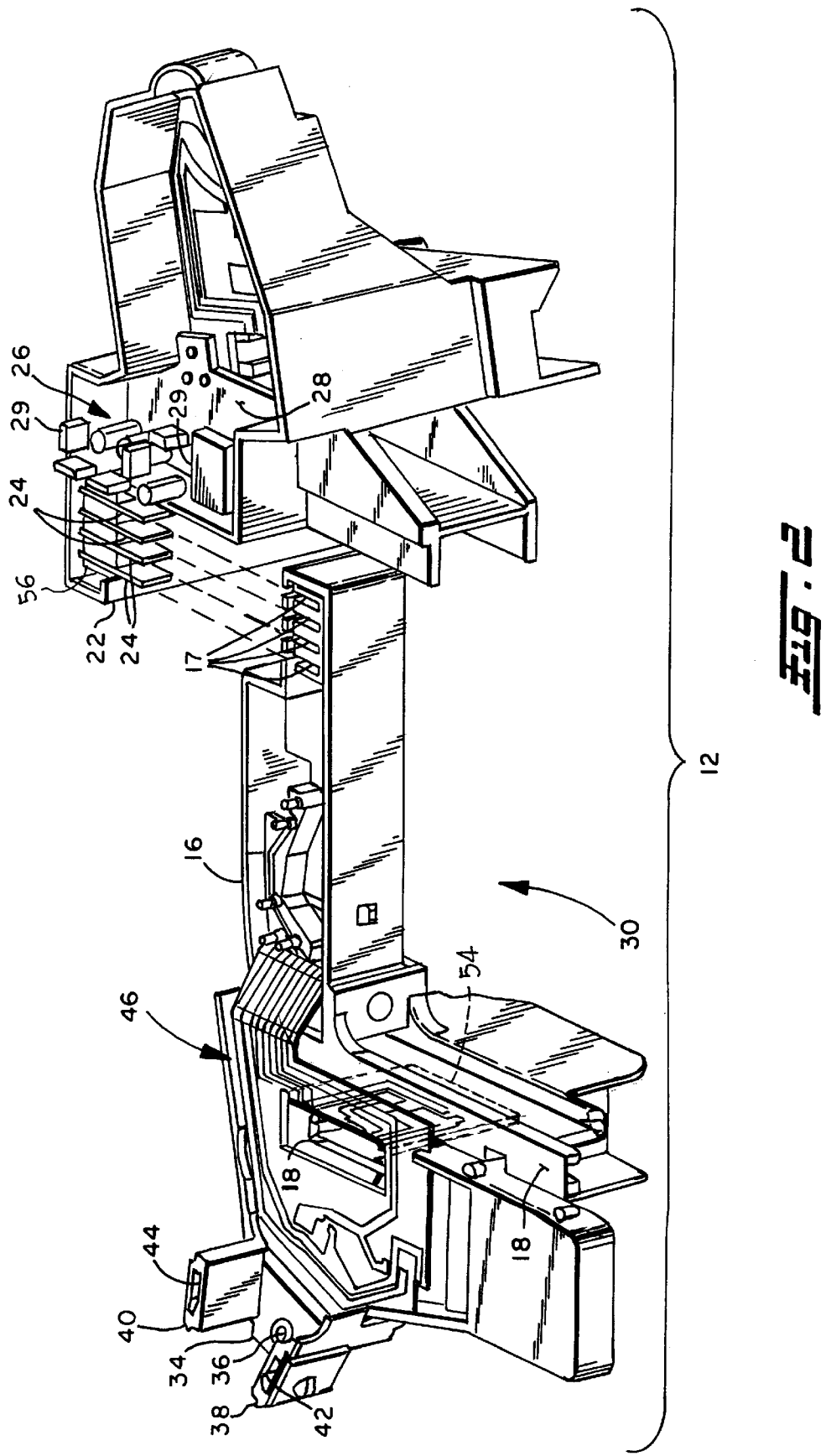

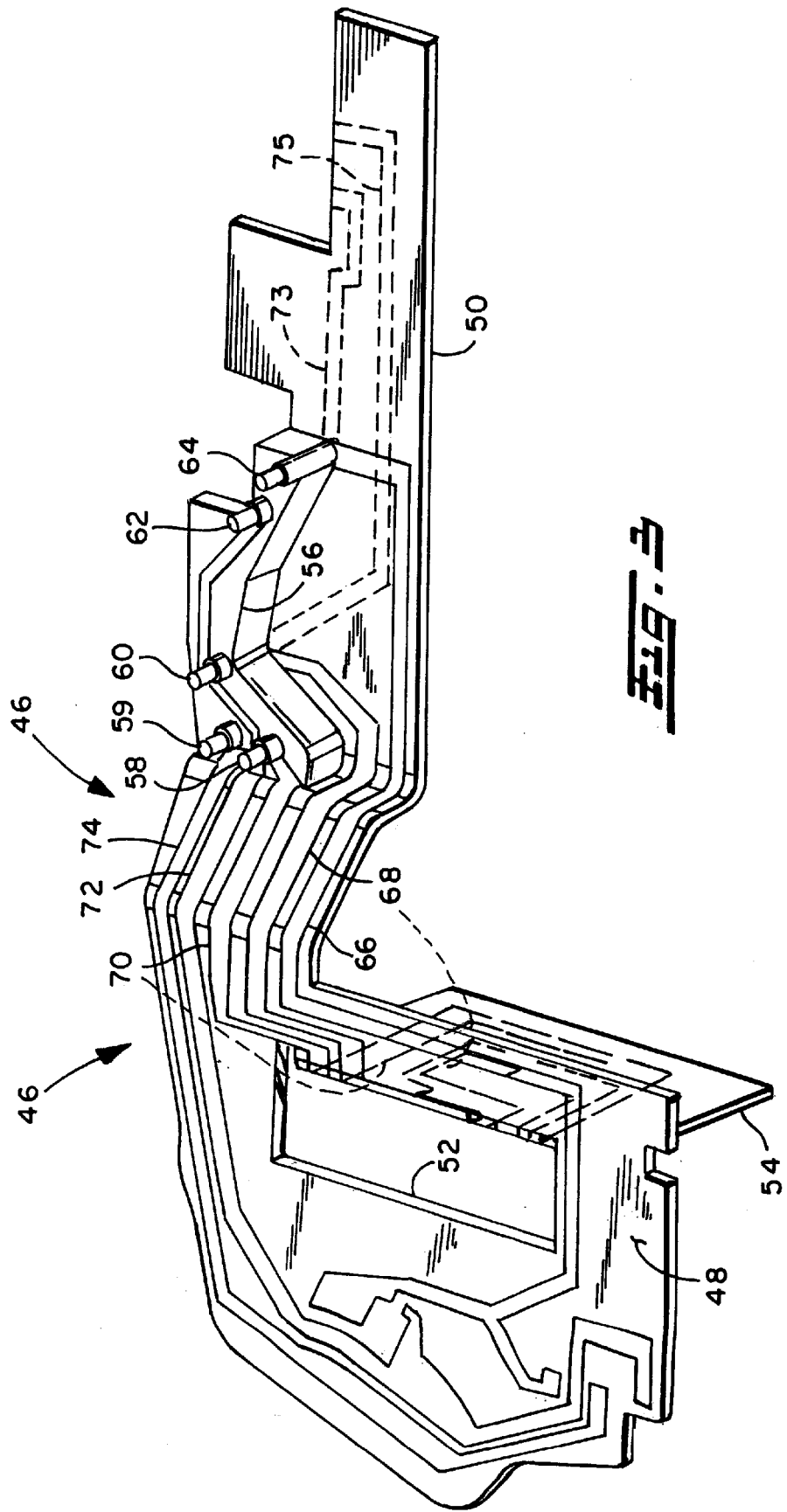

STEERING COLUMN STALK SWITCH FOR USE WITH MULTIPLEXED ELECTRONIC SWITCHING

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to stalk or lever actuated switches of the type employed for user control of motor vehicle accessories. Such switches are often mounted on a lever or stalk extending from the steering column adjacent the steering wheel for convenient access by the vehicle operator for controlling windshield wipers, headlamps, high beam flashing and cruise control functions, Where motor vehicle accessory control switches are utilized with a multiplexed electronic switching network, it is necessary to incorporate the multiplex signal generating circuitry in association with the control switch in order that the switch may be capable of communicating with the signal bus of the multiplex network.

Heretofore such steering column stalk switches have been employed directly for load current switching and have thus contained conductor strips and switching contacts capable of switching heavy currents for the accessories and have therefore been relatively expensive to manufacture in high volume for motor vehicle application. It has thus been desired to provide such a stalk or lever actuated switch for motor vehicle steering column installation which is capable of the low current switching associated with signal switching for multiplex network installation and which eliminates the need for individual conductor strips and heavy current switching contacts and which is reliable and low in manufacturing costs.

BRIEF SUMMARY OF THE INVENTION

It is an object of the present invention to provide a stalk or lever actuated switch for installation on a motor vehicle steering column which is reliable, low in cost and capable of providing a signal input to electronic multiplex signal generating circuitry contained within the switch.

It is a further object of the present invention to provide such a stalk or lever actuated motor vehicle steering column switch which is low in manufacturing costs and reliable over the extended vehicle service life.

The present invention provides a stalk or lever actuated steering column switch assembly for motor vehicle steering column applications and which includes a base or housing configured for installation over a steering column and defining first and second fulcruming surfaces for having a user actuated control stalk or lever pivotally mounted thereon with the stalk or lever. The stalk or lever has a carrier portion having contacts thereon which wipe against strips plated on the surface of a two-shot molded plastic insert which communicates the switching contacts with connector terminals and with the associated electronics mounted in the switch housing.

BRIEF DESCRIPTION OF THE DRAWINGS

FIG, 1 is an exploded view of the stalk and housing sub-assembly;

FIG. 2 is an exploded view of the housing sub-assembly, and,

FIG. 3 is an axonometric view of the molded insert for the sub-assembly of FIG. 2.

DETAILED DESCRIPTION OF THE INVENTION

Figure 1:
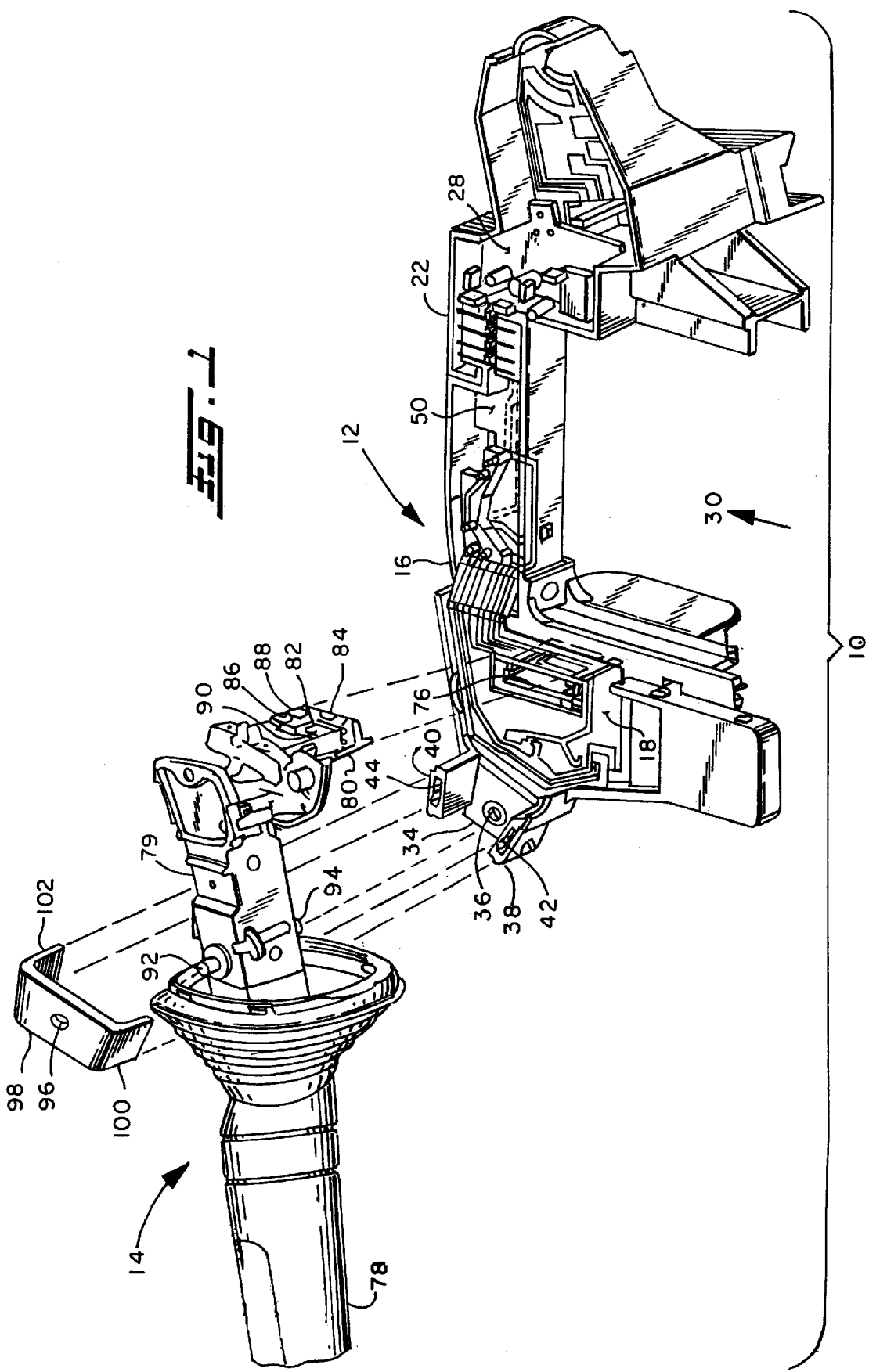

Referring to FIG. 1, the assembly is indicated generally at 10 and includes a housing sub-assembly indicated generally at 12 and a stalk/lever sub-assembly indicated generally at 14 which is adapted for pivotal movement by the user as will hereinafter be described Referring to FIGS. 2 and 3, the sub-assembly 12 is formed of a primary housing shell 16 having a deck portion 18 with an insert disposed thereon which will be hereinafter described in greater detail. An auxiliary housing shell 22 is connected to the primary shell 16 preferably by bayonet quick-disconnect of a plurality of connector terminals 24 inserted into corresponding receptacle slots 17 formed in the primary shell 16. Auxiliary shell 22 has electronic circuitry indicated generally at 26 disposed therein preferably on a circuit board 28 inserted into the shell 22. As shown in FIG. 2, circuitry 26 includes electronic components 29 mounted on board 28 which contain low current circuitry such as multiplex circuitry in a manner known in the art.

The sub-assembly 12 has a generally U-shaped cavity indicated generally at 30 formed therein by the primary and auxiliary shells 16, 22 which U-shaped cavity is configured for installation of the sub-assembly 12 over steering column of a vehicle.

Primary shell 16 has an extension 34 of the deck portion 18 with an aperture 36 formed therein and comprises a fulcruming surface for pivoting a stalk/lever therein as will hereinafter be described in greater detail. Extension 34 has a pair of upstanding stanchions 38, 40 formed thereon, each of which has a slot 42, 44 respectively therein for attachment thereto as will hereinafter be described.

The primary housing shell 16 has a molded insert indicated generally at 46 received therein and mounted securely to the deck 18 by any suitable expedient as for example heat staking, fasteners or a snap-locking attachment.

Referring to FIG. 3, the insert assembly 46 is illustrated removed from the subassembly 12 and has a deck portion 48 with an offset extension 50 formed integrally therewith and with deck 48 having a preferably rectangular aperture or cut out 52 formed therein.

The undersurface of deck 48 has a downwardly extending projection 54 which extends along one side of the aperture 52 and downwardly from deck 48. The extension 50 of insert 46 has a connector block portion 56 extending upwardly from the surface of the extension 50. The connector block 56 having a plurality of connector terminals denoted by reference numerals 58, 60, 62, 64 provided thereon which are connected in the manner as will hereinafter be described.

In the present practice of the invention, the insert 46 is molded of thermoplastic material in two stages or shots and has the second stage comprising strips of thermoplastic extending along the upper surface of deck 48 and extension 50 and on the left hand face of the downwardly extending projection 54. These strips are molded of suitably treated thermoplastic material such that a subsequent plating operation may be performed thereon to render the surface of the strips electrically conducted. In FIG. 3 the strips are denoted by reference numerals 66, 68, 70, 72, 74. Strips 68, 72 and 74 extend from respectively connector terminals 60, 58 and 59 to terminate on the surface of deck 48. Terminal strips 68 and 70 extend from terminals 58 and 60 to terminate on the left hand surface of the downward extending projection 54 as denoted by dashed outline in FIG. 3.

Referring to FIGS. I and 2, primary housing shell 16 has an aperture, void or cavity 76 formed in the deck 18 and into which extends the downward projection 54 of molded insert 46 when secured into the primary shell 16.

Referring to FIG. 1, the stalk/lever assembly 14 has a user control portion 78 formed at the remote end thereof and a carrier portion extending generally at right angles and downwardly from the control portion 78 and disposed at the remote end thereof as indicated by reference numeral 80. The carrier 80 has plurality of electrical switching contacts 82, 84, 86, 88, 90 formed on the right hand face of the downwardly extending portion of the carrier 80. The control 78 is connected to a body portion 79 from which the carrier 80 depends. The body portion 79 has a pair of oppositely directed stanchions 92, 94 extending therefrom with stanchion 94 engaged in the aperture 36 formed in deck extension 34. The conductor strips are connected to the electronic circuitry via interconnecting strips (not shown) which interconnect with terminals 24 which are in turn converted to components 26 on circuit board 28.

The upwardly extending stanchion 92 is journaled in an aperture 96 formed in a cap or cover 98 which has a pair of downwardly extending tabs 100, 102 which are respectively engaged in the slots 42, 44 in the stanchions 38, 40. The surfaces of stanchions 92, 94 serve, when assembled into apertures 36, 96 respectively and in cooperation with the surfaces of the apertures to define a fulcrum for the stalk/lever subassembly 14. Thus, user movement of the control end 78 of the stalk/lever assembly 14 causes horizontal movement of the contacts 82 through 90 so as to wipe against the ends of the strips 68, 70 which extend on the face of projection 54 to thereby effect a switching function.

The present invention thus provides a unique and relatively low cost reliable design for a low current switching assembly of the type which is stalk/lever actuated and which includes electronic circuitry adapted for connection to a signal bus of a multiplex switching system. The present invention is particularly applicable to the stalk/lever switch assembly of the type intended for installation on a motor vehicle steering column where it is desired to have certain vehicle accessory functions controlled by the stalk/lever and where it is desired to interface such a switch with a multiplex switching system of the vehicle.

Although the invention has hereinabove been described with respect to the illustrated embodiments, it will be understood that the invention is capable of modification and variation and is limited only by the following claims.

We claim:

1. A switch assembly for assembly over a vehicle steering column and for having at least one stalk or lever actuator extending in a direction outwardly of the steering column for user movement thereof comprising:

(a) housing shell means having a first deck portion with a void formed therein and including first and second fulcrum defining surfaces;

(b) an insert molded of dielectric material and having a second deck portion with a cut-out therein, said insert received on said first deck portion of said housing shell means, said insert having a projection formed integrally with said second deck portion adjacent said second deck portion cut-out and extending through said housing shell means void; said second portion deck and projection having a plurality of electrically conductive strips plated on said dielectric material for sliding electrical connection thereto;

(c) a stalk having a user control on one end thereof and a stalk body portion having a carrier formed integrally with said stalk on the end opposite said user control, said carrier having a plurality of electrical switching contacts formed thereon, said stalk including structure defining fulcruming surfaces intermediate said one end and said carrier, said fulcruming surfaces pivotally engaging said first and second fulcrum defining surfaces of said housing shell means, with said carrier extending through said insert cut-out and said first deck portion void for slidably contacting said conductive strips on said insert projection, wherein, upon user movement of said user control, said stalk is pivotally moved on said first and second fulcrum defining surfaces and said electrical contacts effect a switching function on said plated strips of said insert projection.

2. The assembly defined in claim 1, wherein said insert is snap-locked into said housing shell means.

3. The assembly defined in claim 1, wherein said housing shell means includes a primary shell and an auxiliary housing shell including a circuit board attached to said auxiliary housing shell, said primary and auxiliary shells forming a yoke adapted for attachment to a steering column.

4. The assembly defined in claim 1, wherein said insert has a circuit board configuration with said conductive strips plated thereon.

5. The assembly defined in claim 1, wherein said insert has a circuit board configuration with said second deck portion extending generally perpendicular to said deck.

6. The assembly defined in claim 1, wherein said housing means comprises a first housing shell having said insert mounted thereon and a cover with said fulcrum defining portions are formed on said first housing shell and on said cover.

7. The assembly defined in claim 1, wherein said housing shell means has said first fulcrum defining surface formed integrally with said first deck portion, and said second fulcrum defining surface is formed on a member attached to said first deck portion.

8. The switch assembly defined in claim 1, wherein said housing shell means has a generally U-shaped configuration.

9. A low-current switch assembly comprising:

(a) housing means having a deck portion with a void formed therein and including first and second fulcrum defining surfaces;

(b) an insert molded of dielectric material and having (i) a portion having a cut-out therein, said insert received on said deck portion of said housing means (ii) a projection portion formed integrally with said insert adjacent said cut-out and extending through said void in said housing means (iii) a plurality of electrically conductive plated strips on said dielectric material, said strips each having an end terminating on said insert projection portion;

(c) a stalk/lever having a user control on one end thereof and body portions with a carrier formed integrally with said body portion on the end opposite said user control, said carrier having a plurality of electrical switching contacts formed thereon, said stalk/lever defining fulcruming surfaces intermediate said one end and said carrier, said fulcruming surfaces pivotally engaging said deck and fulcrum defining surface of said housing means with said carrier extending through said insert cut-out and said deck void for slidably contacting said conductor strips on said insert projection, wherein upon user movement of said control, said stalk is pivotally moved on said housing means fulcrum defining surfaces and said electrical contacts effect a switching function with said plated strips of said insert projection; and, (d) a circuit board including electronic components associated with said housing means said circuit board for external connection thereto.

10. The assembly defined in claim 9, wherein said housing means has a generally U-shaped configuration for mounting over a vehicle steering column.

11. The assembly defined in claim 9, wherein said housing means includes a primary housing shell and an auxiliary housing shell releasably connected to said primary shell; and, said circuit board is attached to said auxiliary shell.

* * * * *